March 8, 1949.  P. HUBER ET AL  2,463,770
INTERNAL PIVOT ELECTRICAL MEASURING INSTRUMENT
Filed Oct. 29, 1946  2 Sheets-Sheet 1

Inventor:
Paul Huber,
Alexander T. Williams,
By Pierce, Scheffler & Parker,
Attorneys.

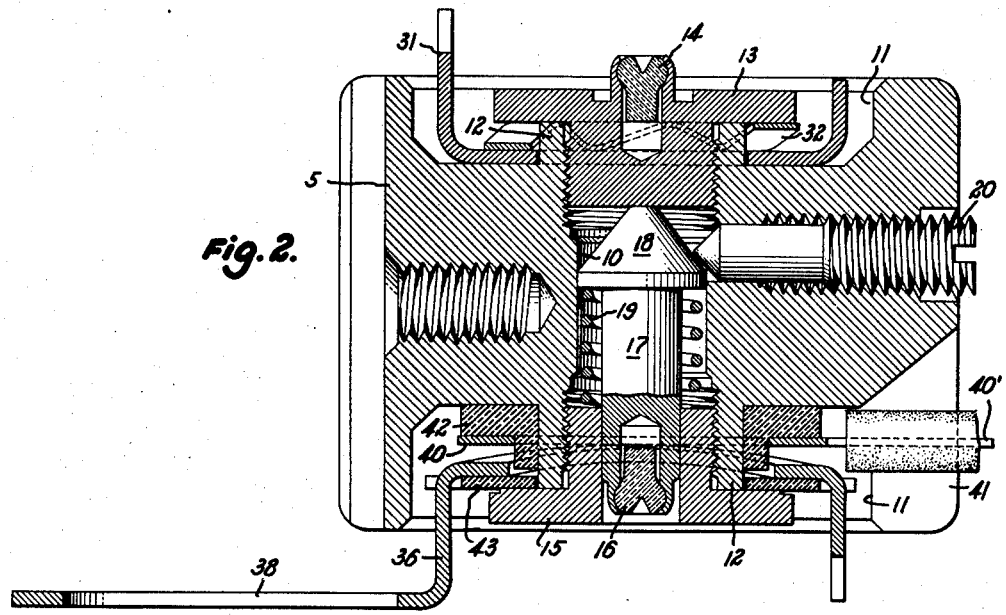
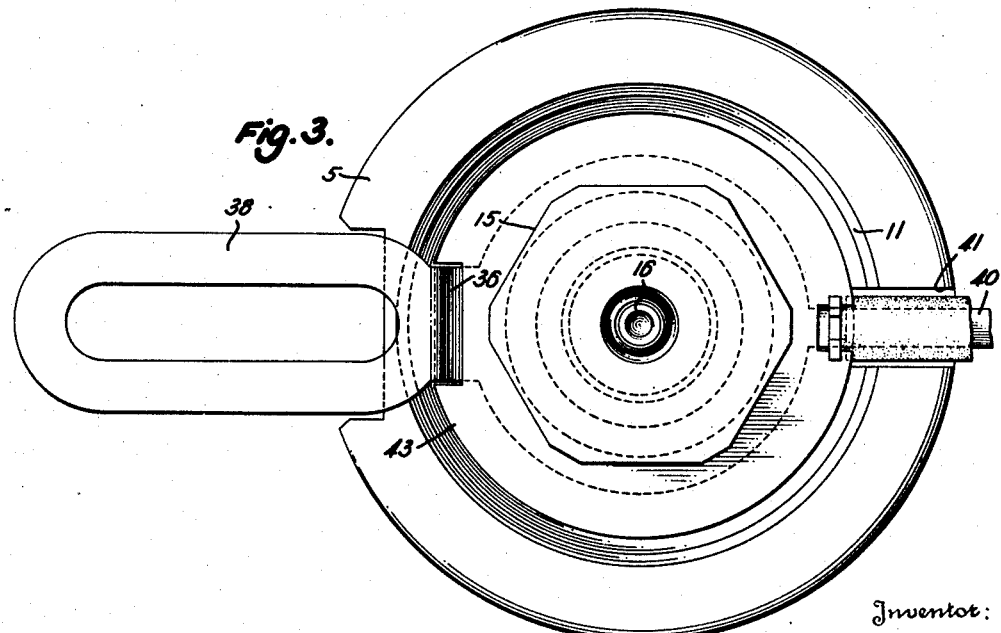

Patented Mar. 8, 1949

2,463,770

UNITED STATES PATENT OFFICE 2,463,770

INTERNAL PIVOT ELECTRICAL MEASURING INSTRUMENT

Paul Huber, Hillside, and Alexander T. Williams, Westfield, N. J., assignors to Weston Electrical Instrument Corporation, Newark, N. J., a corporation of New Jersey Application October 29, 1946, Serial No. 706,376

15 Claims. (Cl. 171—95)

This invention relates to electrical measuring instruments and more particularly to instruments in which the bearings for the moving coil are located within the coil.

The thickness of a measuring or control instrument may be reduced by substituting internal bearings for the conventional external bearings, and various proposals for internal bearing constructions have been made from time to time. The prior proposals have not been entirely satisfactory for various reasons. It is not advisable, for example, to mount the jewel bearings upon the moving coil since this increases the weight and inertia of the moving system. In other of the proposed constructions, no provision was made for a zero corrector adjustment. Other objections were that the constructions were too complex for commercial production or, alternatively, were too simple and crude for even an approximation to precision operation.

Objects of the invention are to provide electrical measuring and/or control instruments of the internal bearing type which eliminate the objectionable features of the prior proposals and which afford a maximum reduction in the thickness of the instruments. An object is to provide instruments of the type stated which include zero adjustor mechanism. An object is to provide instruments of the type stated in which the bearing pressure may be finely adjusted to a desired value. More specifically, an object is to provide a measuring or control instrument of the type in which the coil bearings or the coil staffs are supported on the core of the instrument, one bearing assembly being substantially fixed and the other being adjustable to displace a jewel bearing or a staff positively to obtain a desired bearing adjustment.

These and other objects and adantages of the invention will be apparent from the following specification when taken with the accompanying drawings in which:

Fig. 2 is a longitudinal sectional view of the core and bearing assembly on a larger scale; and Fig. 3 is an end elevation of the same.

Figure 1:
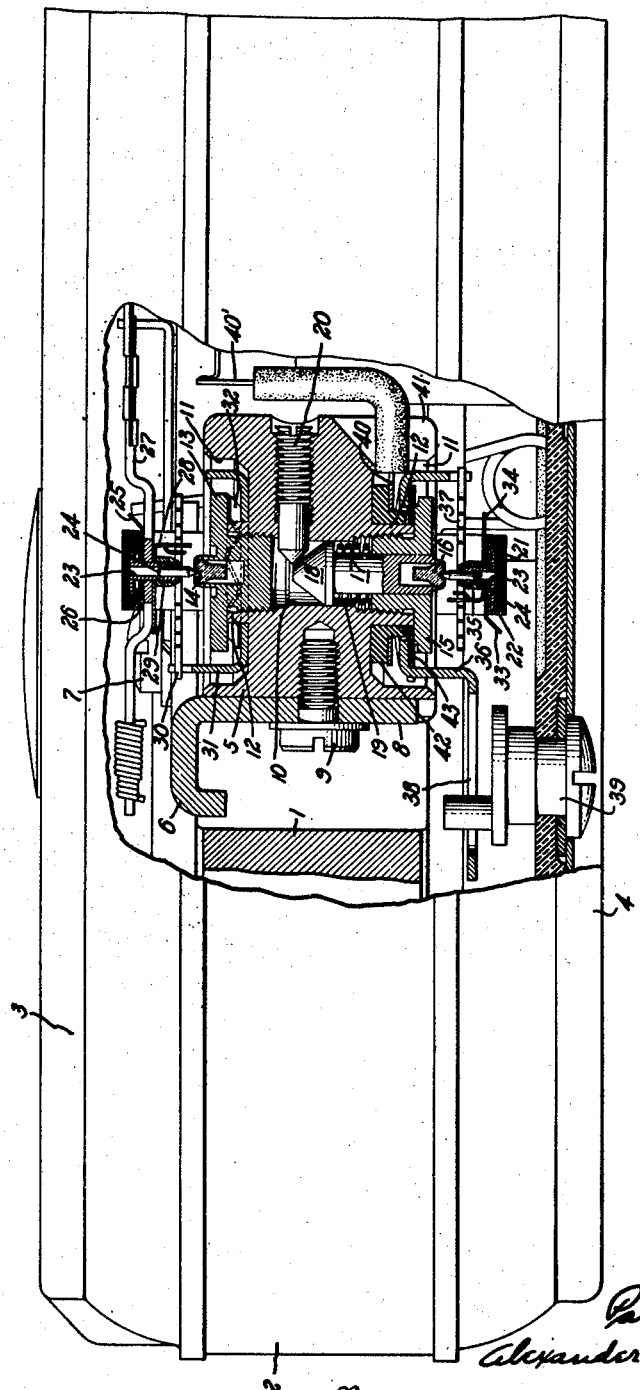
Fig. 1 is a fragmentary side elevation of an instrument or relay embodying the invention, and with the core, the coil and associated parts shown in central longitudinal section.

In the drawings, the reference numeral 1 identifies the permanent magnet of a direct current measuring instrument or relay which is housed within a casing consisting of a relatively shallow insulating base 2 and cover plates 3, 4 which are secured to the opposite faces of the insulating base. The magnet 1 is mounted upon the base 2 by an appropriate means, not shown, and a soft iron core 5 of approximately cylindrical form is supported in the interpolar gap of the magnet 1 by a bridge 6 of non-magnetic material. The bridge is clamped against the upper face of the magnet by screws 7 which extend through the bridge and into the base 2, and a depending tongue 8 of the bridge fits within a longitudinal slot at the inner face of the core 5 and is apertured to pass the screw 9 which clamps the core to the bridge.

A passage extends axially through the core 5, the central portion 10 being cylindrical and the ends being enlarged and threaded. The ends of the core 5 are countersunk with annular recesses and the cylindrical, internally threaded portions 12 of the core are cut back from the end faces of the core. A bushing 13 which carries a jewel 14 is threaded into the upper threaded portion 12 of the core, the bushing having a hexagonal flange which seats against the upper end of the cylindrical portion. A bushing 15 which has a central bore is threaded into the lower cylindrical portion 12 and has a hexagonal flange seating against its lower end. A lower jewel bearing 16 is mounted in the cylindrical end of a piston 17 which is slidable in the bore of the bushing 15 and has an enlarged head 18 of conical form slidable in the central section 10 of the axial passage through the core 5. A coiled spring 19 surrounds the piston 17 and tends to withdraw the piston into the core. A screw 20 is threaded into the core 5 from its outer side and has a conical end contacting the conical head 18 of the piston 17 to force the piston outwardly.

The moving system of the instrument or relay includes a coil 21 wound within a rectangular frame or from 22 which is centrally apertured at its opposite ends to pass the externally threaded bushings 23 in which pivot pins 24 are mounted. The pivot pins are seated on the jewels 14, 16 and the lower jewel 16 is adjusted axially by turning the screw 20 to move the piston 17 outwardly against the helical spring 19.

A coil terminal washer 25 is mounted on the upper pivot bushing 23, and insulated from the coil form 22 by a disk 26, and the centrally apertured section of a pointer or pointer support 27 is seated against the inner surface of the terminal washer 25. An inner spring abutment 28 is seated against the pointer or pointer support 27, and the assembly is clamped to the coil form 22 by a nut 29 which is threaded upon the bushing 23. A spiral spring 30, which also serves as a lead for grounding the coil terminal 25 on the bridge 6, has its opposite ends secured to the inner spring abutment 28 and an outer spring abutment 31 which has a central apertured section fitted over the upper cylindrical section 12 of the core 5, and which is held in good electrical contact with the core 5 by a spring washer 32 which lies between the spring abutment 31 and the flanged head of the upper bushing 13.

A terminal washer 33 and an inner spring abutment 34 are mounted within the lower end of the coil form 22 by a nut 35 which is threaded upon the lower pivot bushing 23. The outer abutment 36 for a spiral spring 37 is a domed, resilient washer having a slotted extension 38 for receiving the eccentrically located pin of a zero adjustor 39 which is mounted in the lower cover plate 4. A terminal washer 40 overlies the spring abutment 38 and has an integral tongue 40' which extends through a slot 41 in the outer face of the core 5 to terminate at a point where it is convenient to solder a lead to the tongue. The spring abutment 38 contacts the washer 40 to complete the circuit to the lower coil terminal, and the spring abutment and washer are insulated from the core by insulating disks 42, 43.

The method of assembly of the coil on its bearings will be apparent from the following description. The lower jewel bearing is retracted by the spring 19 when the adjusting screw 20 is backed off, and the coil 21 is placed in position with its upper pivot 24 seated on the upper jewel 14. The screw 20 is then turned inwardly to force the piston 17 outwardly to seat the lower pivot 24 on its bearing jewel 16. The mechanical stability of the new construction is equal to that of the conventional constructions with external bearings since the bearing clearance is not established by a spring but by a positive slow-motion adjustment of the movable bearing 16.

The reduction in the thickness or axial length of the moving system and its supports is a primary advantage of the new construction, but the invention is also useful when minimum size is not important. The assembly of the new instruments does not present any unusual problems and, in general, the moving systems with the internal bearings can be assembled on a commercial scale with at least the same facility and efficiency as the prior moving systems with external bearings.

It is to be understood that the invention is not limited to the particular construction herein shown and described since various changes may be made in the relative size, shape and location of the several parts without departing from the spirit and scope of the invention as set forth in the following claims.

We claim:

1. In an electrical measuring or relay instrument, the combination with a magnet having spaced poles, and a core in the gap between said poles, of a moving system comprising a coil, cooperating bearing elements carried by said core and coil to support said coil for pivotal movement about said core, sets of cooperating spring abutments mounted on said core and coil respectively, the spring abutments of the coil being located within the coil, spiral springs connected between the cooperating spring abutments of each of said sets, and a pointer carried by said coil.

2. In an electrical measuring or relay instrument, the invention as recited in claim 1, wherein said pointer extends through said coil.

3. In an electrical measuring or relay instrument, the invention as recited in claim 1, wherein said elements carried by the core are supported thereon for relative movement towards and away from each other, compressive spring means tends to move said bearing elements towards each other, and manually adjustable means is provided for positively displacing one of said elements against the force exerted by said compressive spring means.

4. In an electrical measuring or relay instrument, the invention as recited in claim 1, wherein the opposite ends of said core are countersunk, and the spring abutments mounted on said core are located within the countersunk ends thereof.

5. In an electrical measuring or relay instrument, the invention as recited in claim 1, wherein the opposite ends of said core are countersunk, the spring abutments mounted on said core are located within the countersunk ends thereof, and the bearing elements carried by said core include means for securing said spring abutments to the core.

6. In an electrical measuring or relay instrument, the invention as recited in claim 1, wherein said sets of cooperating bearing elements each comprise a jewel bearing carried by the core and a staff carried by the coil.

7. A core and bearing assembly for an electrical measuring or relay instrument, said assembly comprising a substantially cylindrical core having an axial passage therethrough, bushings mounted in the opposite ends of said passage, a bearing element carried by one of said bushings, the other bushing having an axial bore therethrough, a piston slidably mounted in said bore and carrying a second bearing element, spring means tending to withdraw said piston into the core, and means adjustable to force said piston outwardly.

8. A core and bearing assembly as recited in claim 7, wherein said piston has a conical head, and said adjustable means comprises a screw threaded into said core transversely thereof and having a conical end for engaging the conical head of said piston.

9. A core and bearing assembly as recited in claim 7, wherein the ends of said core are countersunk, in combination with spring abutments seated in said countersunk ends of the core, said bushings having flanges extending over the spring abutments to secure the same to said core.

10. A core and bearing assembly as recited in claim 7, wherein the ends of said core are provided with annular recesses, and the portions of the core within said recesses are cut back from the end faces of said core, in combination with spring abutments seated in said annular recesses, said bushings having flanges extending over the spring abutments to secure the same to said core, the outer faces of said bushings being substantially flush with the ends of said core and the inner faces of the bushing flanges being seated on said cut-back ends of the core.

11. A core and bearing assembly for an electrical measuring or relay instrument, said assembly comprising a substantially cylindrical core having an axial passage therethrough, the ends of the passage being internally threaded, means including bushings threaded into the ends of said passage for supporting bearing elements, spring abutments secured to the opposite ends of said core by said bushings, means insulating one of said spring abutments from said core, and a lead having an end secured to said core and contacting said insulated spring abutment.

12. A core and bearing assembly as recited in claim 11, wherein the ends of said core are countersunk with annular recesses to receive said spring abutments, and the threaded ends of said passage are cut-back from the ends of said core, said bushings having flanges seated against the cut-back ends of the passage and extending over the spring abutments to secure the same to said core.

13. A coil assembly for an electrical measuring or relay instrument, said assembly comprising a coil of rectangular form, bearing elements mounted on the opposite ends of and within said coil, and spring abutments secured to the opposite ends of and within said coil.

14. A coil assembly as recited in claim 13, in combination with a pointer secured to and extending through said coil.

15. A core and bearing assembly as recited in claim 11, wherein one of said spring abutments has a slotted extension for receiving a zero adjustor pin.

PAUL HUBER.
ALEXANDER T. WILLIAMS.

REFERENCES CITED

The following references are of record in the file of this patent:

UNITED STATES PATENTS

| Number | Name | Date |
| --- | --- | --- |
| 919,171 | Hodge | Apr. 20, 1909 |
| 995,292 | Roller | June 13, 1911 |

Disclaimer 2,463,770.—*Paul Huber*, Hillside, and *Alexander T. Williams*, Westfield, N. J. INTERNAL PIVOT ELECTRICAL MEASURING INSTRUMENT. Patent dated Mar. 8, 1949. Disclaimer filed Oct. 11, 1949, by the assignee, *Weston Electrical Instrument Corporation*.

Hereby enters this disclaimer to claims 13, 14, and 15 of said patent.

[*Official Gazette November 29, 1949.*]